Patented June 17, 1924.

1,497,815

UNITED STATES PATENT OFFICE.

WALLACE B. VAN ARSDEL, OF BERLIN, NEW HAMPSHIRE, ASSIGNOR TO BROWN COMPANY, OF BERLIN, NEW HAMPSHIRE, A CORPORATION OF MAINE.

CATALYST.

No Drawing.     Application filed October 11, 1921.   Serial No. 507,081.

*To all whom it may concern:*

Be it known that I, WALLACE B. VAN ARSDEL, citizen of the United States, residing at Berlin, in the county of Coos and State of New Hampshire, have invented new and useful Improvements in Catalysts, of which the following is a specification.

The object of the present invention is to produce a highly active and bulky catalytic material for use in the hydrogenation of fatty acids, their glycerides and esters.

I have found that silica gel, when used as a carrier for the catalytic metal as herein described, produces a bulky catalytic material which can successfully be used for the purposes stated.

In accordance with my process, I mix creamy precipitated nickel hydroxide with a pure sodium silicate solution and then neutralize the sodium silicate with dilute hydrochloric acid insufficient to dissolve the nickel hydroxide. (Note: This can be done conveniently by adding an indicator such as phenolphthalein, and adding acid just to the end point of the indicator.) As a result of this operation, a silica gel is precipitated in admixture with the gelatinous nickel hydroxide. This mixed gel is then dried and washed to remove the soluble salt resulting from the reaction. It is then calcined at a temperature of approximately 450° C. to change the nickel hydroxide to nickel oxide, after which the mass is again washed, and, after being dried, is reduced in hydrogen at a suitable temperature, say 370° C.

The precipitated nickel hydroxide may be prepared from any suitable soluble nickel salt, such for example as nickel chloride or nickel sulphate by reaction with caustic soda and removing the precipitated hydroxide from the soluble products of the reaction by filtration or settling. When sodium silicate is in admixture with the precipitated nickel hydroxide and it is treated with just sufficient dilute hydrochloric acid to precipitate silica gel without dissolving the nickel salt, the reaction may be expressed as follows: $Ni(OH)_2 + Na_2SiO_3 \cdot 2SiO_2 + 2HCl = Ni(OH)_2 + 2NaCl + 3SiO_2 + H_2O$. The silica gel, produced by this reaction, is colloidal and its bulk is very large, is highly absorptive, and has a very large surface exposure. While the proportions of sodium silicate to nickel hydroxide may be varied, I have found excellent results to be secured by using such proportions that the catalytic material when reduced contains approximately 21.5% total nickel.

When dilute acid is added to the suspension of nickel hydroxide in a sodium silicate solution, a mixed gel results, as previously explained, which possibly or probably forms a molecular mixture, so that on drying a solid solution is produced. Hence, when the nickel is formed by reduction of the mass, the nickel is disseminated in or throughout the granules of the silica. This impregnation of the silica with the nickel produces a catalytic material having a high degree of activity.

What I claim is:—

1. A process of producing a catalytic material, which comprises mixing gelatinous nickel hydroxide with a sodium silicate solution, precipitating silica gel therein by treatment with a predetermined amount of acid insufficient to dissolve the nickel hydroxide, calcining the mixed gels to precipitate nickel oxide in the silica gel, and reducing the nickel oxide.

2. A process of producing a catalytic material, which comprises mixing gelatinous nickel hydroxide with a sodium silicate solution, treating the mixed gel with a quantity of acid sufficient to precipitate silica gel but insufficient to dissolve the nickel compound, thereby impregnating the silica gel with the nickel oxide, and reducing the nickel oxide.

3. A process of producing a catalytic material, which comprises mixing gelatinous nickel hydroxide with a solution of sodium silicate, precipitating a silica gel from such sodium silicate, producing a mixed dehydrated gel of nickel hydroxide and silica, and reducing the nickel hydroxide.

In testimony whereof I have affixed my signature.

WALLACE B. VAN ARSDEL.